No. 739,035. PATENTED SEPT. 15, 1903.
J. M. TRINER.
SPRING BALANCE.
APPLICATION FILED FEB. 16, 1899.
NO MODEL.
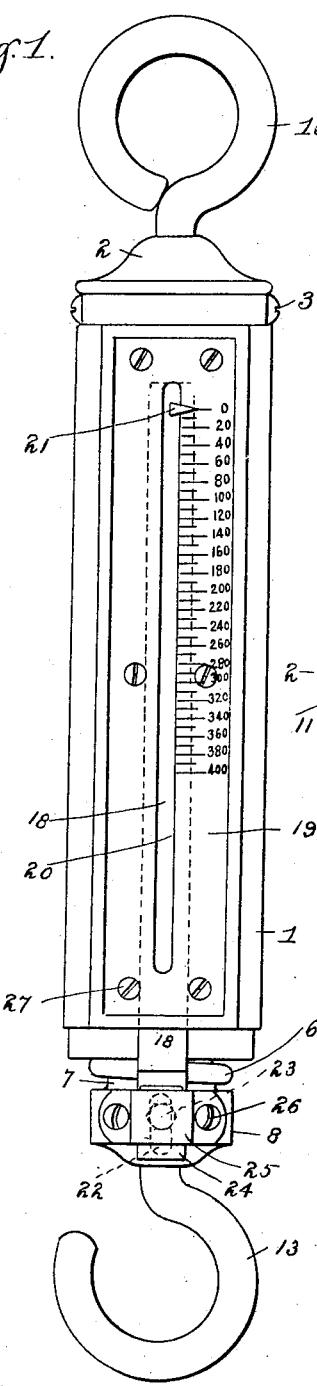
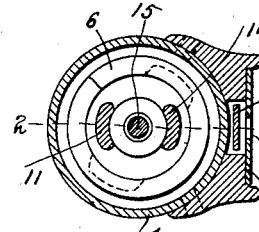
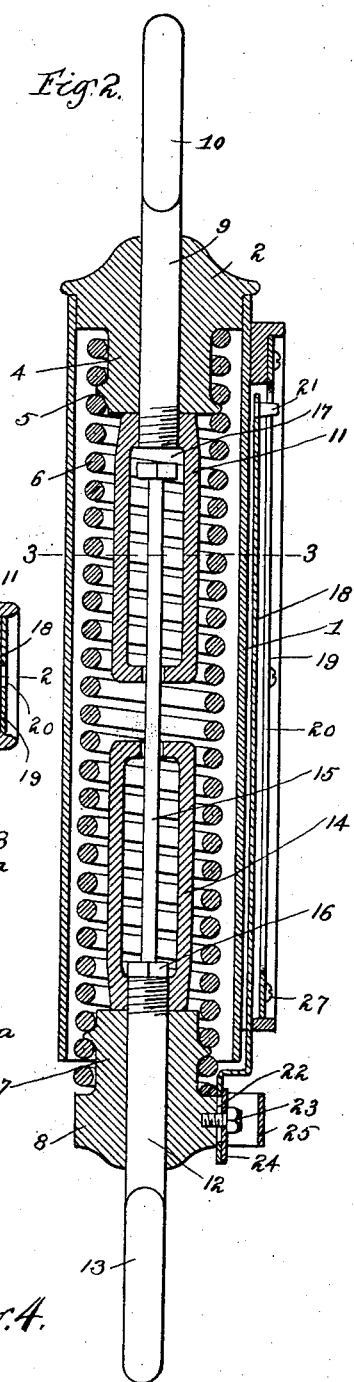
Witnesses.
Wm M Rheem
Edward K Barrett
Inventor.
Jas. M. Triner
by Elliott & Hopkins
att'ys.

No. 739,035. Patented September 15, 1903.

UNITED STATES PATENT OFFICE.

JAMES M. TRINER, OF CHICAGO, ILLINOIS, ASSIGNOR TO THE PELOUZE SCALE & MFG. CO., OF CHICAGO, ILLINOIS, A CORPORATION OF ILLINOIS.

SPRING-BALANCE.

SPECIFICATION forming part of Letters Patent No. 739,035, dated September 15, 1903.

Application filed February 16, 1899. Serial No. 705,623. (No model.)

*To all whom it may concern:*

Be it known that I, JAMES M. TRINER, a citizen of the United States, residing at Chicago, in the county of Cook and State of Illinois, have invented certain new and useful Improvements in Spring-Balances, of which the following is a full, clear, and exact specification.

My invention relates more particularly to that class of scales or spring-balances in which a suspended coil-spring is connected at its lower end to the index or pointer and also to the hook or other device for supporting the material to be weighed. There are various uses to which scales of this character are put in which the careless handling of the object to be weighed results in stretching or elongating the spring, and thereby rendering the scale inaccurate by causing the index or pointer to stand normally at a more or less high graduation on the scale instead of at zero, where it should stand. This defect is especially common in the use of the scale for weighing ice, for it is customary for the iceman to attach the scale to the block of ice before the block is removed from the wagon or other resting-place and then pull the block out and allow it to fall until arrested in its descent by the tension of the spring alone. Such use of the scale results in the spring of a scale adapted, say, for weighing four hundred pounds as a maximum weight being stretched beyond four hundred by a weight which is less than four hundred, and consequently the spring is so elongated that its weighing capacity with reference to the scale-dial is materially affected, and the index or pointer is caused to show a false and excessive weight.

The primary object of my invention, therefore, is to provide the balance or scale with means for sustaining the weight placed thereon independently of the spring when the weight exceeds a certain amount, thus relieving the spring of undue stretching.

A further object of my invention is to provide scales of this character with an adjustable index or pointer whereby such index may be set at zero under normal conditions should it through any cause be forced out of adjustment with reference to the graduations on the scale-dial.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a face view of my improved scale. Fig. 2 is a vertical longitudinal section thereof, taken on the line 2 2, Fig. 3. Fig. 3 is a transverse section taken on the line 3 3, Fig. 2; and Fig. 4 is a modification hereinafter explained.

1 represents the casing of the scale or balance, which is constructed, preferably, of a section of tubing of sufficient length to house the spring and other parts. In the upper end of the casing 1 is secured a plug or cap 2 by means of screws 3 and having on its inner side a boss 4, provided with the usual fins 5, which enable the boss being screwed into or between the convolutions of the spring 6. Into the lower end of the spring is screwed a similar boss 7, formed on the upper end of a head 8.

Swiveled in and passing through the plug 2 is a shank 9, on whose upper end is formed a supporting-ring 10 or equivalent device, while the lower end of the shank 9 is screwed into or otherwise secured in the upper end of a yoke 11, and passing through and swiveled in the head 8 is a similar shank 12, whose lower end carries a hook 13 or other device for the support of the material to be weighed, while its upper end is screwed into or otherwise secured to another yoke 14 similar to the yoke 11. These two yokes 11 and 14 are located within the spring 6, and their opposed ends are perforated for the passage of a rod 15, which when the parts are in their normal position, as shown in Fig. 2, is of not greater length than the distance between the inner sides of the outer ends of the yokes, and each end of the rod 15 carries a head or stop 16 17, secured thereon in any suitable manner and being of sufficient size to prevent the rod being entirely pulled from either of the yokes 11 14. The distance between these two heads 16 17 is such that the spring may be elongated or stretched to the full capacity of the scale-dial and preferably a little beyond such capacity; but should the weight or jerk on the spring be sufficient to stretch it an abnormal extent or an extent that would be detrimental to it the head 17 would come in contact with the lower end of the yoke 11 and the head 16 in contact with the upper end of the yoke 14 before such abnormal elongation of the spring is reached, and consequently the rod 15, with the yokes and connected parts, would sustain the abnormal strain and relieve the spring thereof. The stems 9 12, with the yokes 11 14 connected therewith, being swiveled in the plug 2 and head 8, respectively, it will be seen that they may revolve independently of each other and also independently of the spring and the balance of the scale, thus avoiding all strain by the twisting of the load being weighed and also enabling the user to revolve the casing to any convenient position for reading the dial.

18 represents an arm or plate which extends up between the casing 1 and the scale-dial shown at 19 and is of sufficient length to close the slot 20 of the scale-dial from end to end when the parts are in their normal position. The upper end of this arm 18 is provided with an index or pointer 21, while its lower end is bent inwardly and thence downwardly and provided in such downwardly-extending portion with a vertical slot 22, through which passes a set-screw 23, the latter being threaded in the head 8 and serving to clamp the bar or plate 18 in any position to which it may be adjusted, thus enabling the ready adjustment of the index 21 should it fail to register with zero under normal conditions. Located under the head of the screw 23 is a washer 24, which completely covers the lower downturned end of the plate 18 and excludes the slot 22 from view, so as to avoid the suggestion offered by the presence of the slot that the index might be adjusted for indicating a false weight. It is also preferable to cover the head of the screw 23 by a shield 25, secured to the head 8 by screws 26, so that it will be necessary to remove the shield 25 before the index can be conveniently adjusted. The bar 18 is guided in its longitudinal movement by the index 21 working in the slot 20 and also by the screws or rivets 27, which hold the scale plate or dial 19 in place.

In the form of my invention shown in Fig. 4 I employ two U-shaped links 11ᵃ 14ᵃ instead of the yokes 11 14 and the bar 15 before described. These links 11ᵃ 14ᵃ are interlocked and slide back and forth within the spring, as before described with reference to the yokes 11 14; but in many respects the links 11ᵃ 14ᵃ are superior to the construction described in Fig. 2, especially in that by their employment all danger of friction against the spring or of their ends becoming engaged between the convolutions of the spring is absolutely avoided. Furthermore, they constitute a universal joint that will permit the spring to be bent in either direction when extended from the scale-casing, whereas with the bar 15 such bending would endanger the parts and be likely to bend said bar and cause it to thereafter interfere with the accurate operation of the scale. Each of the links 11ᵃ 14ᵃ has its ends passed through and upset in a ring 28, through which loosely passes the inner ends of the stems 9 12, the rings 28 being held from withdrawal by washers 29, which are in turn held in place by upsetting the end of the stem, as shown at 30, thus permitting the links 11ᵃ 14ᵃ to swivel on the stems and also holding the stems in place and permitting them to swivel or rotate with reference to the head 8 and plug 2.

Having thus described my invention, what I claim as new therein, and desire to secure by Letters Patent, is—

1. A spring-balance having in combination a coil-spring, two members secured in opposite ends of said spring, a support for the spring passing through the upper one of said members and swiveled thereto in line with the longitudinal axis of the spring, a support for the article to be weighed secured to the lower one of said members, two members secured to the first said members respectively, arranged within the spring and connected together at their contiguous ends with capability of a limited independent movement for limiting the stretch of the spring, one of said latter members being also swiveled on the longitudinal axis of the spring, with relation to the aforesaid support for the spring whereby it may rotate with the spring independently of said support, and an index operatively connected with the spring.

2. A spring-balance having in combination a spring, an index operatively connected therewith, a plug secured to one end of said spring, a support for the spring having a swiveled stem passing through said plug, means for supporting the material to be weighed having a stem provided with swivel connection with the lower end of the spring and a link connection between the said stems for limiting the stretch of the spring, substantially as set forth.

3. A spring-balance having in combination a spring, a casing inclosing said spring, a slotted dial-plate secured to said casing, a plate or bar located between said dial-plate and casing and having an index projecting through said slot and provided with a slot in its lower end, a head secured to the lower end of the spring and having means for supporting the material to be weighed, a set-screw passing through said slot in said bar into said head for holding the bar to its adjustment a plate pierced by said screw for excluding said slot in the bar from view and a shield secured to said head over said plate, substantially as set forth.

4. A spring-balance having in combination a spring, an index connected therewith and operated thereby, means secured to one end of said spring for supporting the material to be weighed, means having connection with the other end of the spring for supporting the spring-balance, and two interlocked links arranged within the spring and being connected to the said means respectively and swiveled with reference to the spring, substantially as set forth.

JAMES M. TRINER.

Witnesses:
EDNA B. JOHNSON,
F. A. HOPKINS.